US009317887B2

(12) United States Patent
Lee et al.

(10) Patent No.: US 9,317,887 B2
(45) Date of Patent: Apr. 19, 2016

(54) SIMILARITY CALCULATING METHOD AND APPARATUS

(71) Applicant: Electronics and Telecommunications Research Institute, Daejeon (KR)

(72) Inventors: Joo Young Lee, Daejeon (KR); Sung Kyong Un, Daejeon (KR); Hyun Sook Cho, Daejeon (KR); Youn Hee Gil, Daejeon (KR); Keon Woo Kim, Daejeon (KR); Young Soo Kim, Daejeon (KR); Sang Su Lee, Daejeon (KR); Su Hyung Jo, Daejeon (KR); Woo Yong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 243 days.

(21) Appl. No.: 13/946,693

(22) Filed: Jul. 19, 2013

(65) Prior Publication Data

US 2014/0136534 A1 May 15, 2014

(30) Foreign Application Priority Data

Nov. 14, 2012 (KR) ........................ 10-2012-0128849

(51) Int. Cl.
*G06F 17/30* (2006.01)
*G06Q 50/00* (2012.01)

(52) U.S. Cl.
CPC ...................................... *G06Q 50/01* (2013.01)

(58) Field of Classification Search
CPC ..... G06F 17/3053; G06F 17/30; G06F 15/16; G06F 17/30386; G06F 17/30867; G06F 17/30876; H04L 67/22; H04L 43/16; H04L 67/10; H04L 51/32; G06Q 50/01; G06Q 10/107; G06Q 10/00; G06Q 10/0639; H04N 21/23
USPC ......... 707/732, 737, 711, 741, 748, 749, 758, 707/724, 722, 728, 759, 769, 755, 803, 707/E17.051, E17.009, E17.014, E17.108, 707/E17.069, E17.01, 9, E17.089, E17.044, 707/E17.033, E17.134; 705/7.12, 7.29, 10, 705/1.1, 14.53, 14.49, 14.66, 319, 342, 705/500; 709/203, 204, 205, 223, 224, 233; 715/752, 733; 382/190, 165, 125, 118, 382/117, 115, 106, 103, 107, 236; 725/116
See application file for complete search history.

(56) References Cited

U.S. PATENT DOCUMENTS 8,108,381 B2 * 1/2012 Eberholst ............ G06F 17/3069 707/713
8,463,726 B2 * 6/2013 Jerram et al. .............. 705/14.54

(Continued)

FOREIGN PATENT DOCUMENTS

KR 10-2006-0079792 7/2006
KR 10-2008-0027237 3/2008
KR 10-2012-0025152 3/2012

OTHER PUBLICATIONS

Sung-Hwan Min and Ingoo Han—"Detection of the customer time-variant pattern for improving recommender systems"—Expert Systems with Applications—vol. 28, Issue 2, Feb. 2005, pp. 189-199.*

(Continued)

*Primary Examiner* — Anh Ly
(74) *Attorney, Agent, or Firm* — Kile Park Reed & Houtteman PLLC

(57) ABSTRACT

A similarity calculating method and apparatus are disclosed. A similarity calculating method according to an exemplary embodiment of the present invention includes extracting similarity calculating data, which is determined in advance, by receiving a communication activity record for every user; modeling a communication activity pattern for every user and common information between the users based on the extracted similarity calculating data; and calculating a similarity between users using the modeled communication activity pattern for every user and common information. The modeling includes: modeling the communication activity pattern by calculating a value of a static feature from the similarity calculating data, and modeling the common information by calculating a value of a dynamic feature from the similarity calculating data.

15 Claims, 7 Drawing Sheets

(56) References Cited

U.S. PATENT DOCUMENTS

2002/0178057 A1* 11/2002 Bertram ................. G06Q 30/02 705/14.23
2002/0187641 A1* 12/2002 Liao .............................. 438/692
2003/0167324 A1* 9/2003 Farnham ............... G06F 3/0481 709/224
2004/0044761 A1* 3/2004 Phillipi et al. ................ 709/223
2005/0160280 A1* 7/2005 Caslin et al. .................. 713/189
2005/0163108 A1* 7/2005 Moore et al. .................. 370/352
2005/0245272 A1* 11/2005 Spaur et al. ................ 455/456.3
2005/0249341 A1* 11/2005 Mahone et al. ............... 713/189
2005/0281267 A1* 12/2005 McFadden .............. H04L 12/66 370/395.1
2005/0281276 A1* 12/2005 West et al. .................... 370/411
2006/0020662 A1* 1/2006 Robinson ...................... 709/203
2006/0106847 A1* 5/2006 Eckardt ............. G06F 17/30696 707/E17.093
2006/0282304 A1* 12/2006 Bedard et al. ................... 705/10
2006/0294085 A1* 12/2006 Rose ................. G06F 17/30616 707/E17.084
2006/0294134 A1* 12/2006 Berkhim et al. .............. 707/102
2008/0075063 A1* 3/2008 Ha ................................ 370/351
2008/0089347 A1* 4/2008 Phillipi et al. ................ 370/400
2009/0083231 A1* 3/2009 Eberholst ............ G06F 17/3069 707/E17.009
2009/0228513 A1* 9/2009 Tian ....................... G06Q 10/10 707/E17.005
2009/0234876 A1* 9/2009 Schigel ............. G06F 17/30873 707/E17.032
2009/0282027 A1* 11/2009 Subotin et al. ........ 707/E17.032
2010/0027618 A1* 2/2010 Ozawa ..................... 375/240.01
2010/0070917 A1* 3/2010 Gates ................ G06F 17/30053 707/E17.014
2010/0094981 A1* 4/2010 Cordray et al. ............... 709/222
2010/0331146 A1* 12/2010 Kil ......................... G06Q 30/02 482/8
2011/0093361 A1* 4/2011 Morales ............... G06Q 10/087 705/26.62
2011/0173173 A1* 7/2011 Hall .............................. 707/706
2011/0213785 A1* 9/2011 Kristiansson et al. ........ 707/748
2011/0246483 A1* 10/2011 Darr ....................... G06Q 10/10 707/748
2012/0041944 A1* 2/2012 Martinez et al. .............. 707/722
2012/0137367 A1* 5/2012 Dupont ................... G06F 21/00 726/25
2012/0150960 A1* 6/2012 Nalawade .............. G06Q 30/02 709/204
2012/0215844 A1* 8/2012 Ferlez et al. .................. 709/204
2012/0290640 A1* 11/2012 Mahaffey et al. ............. 709/203
2013/0060787 A1* 3/2013 Doshi .................... G06Q 10/10 707/749
2013/0124449 A1* 5/2013 Pinckney et al. ............... 706/52
2013/0144682 A1* 6/2013 Dhara et al. ................. 705/7.29
2013/0227011 A1* 8/2013 Sharma .................. G06Q 50/01 709/204
2013/0318351 A1* 11/2013 Hirano .................. H04L 9/3073 713/168
2014/0089287 A1* 3/2014 Connolly .......... G06F 17/30873 707/707
2014/0101186 A1* 4/2014 Lau et al. ...................... 707/758
2014/0149177 A1* 5/2014 Frank et al. .................. 705/7.29
2014/0304254 A1* 10/2014 Rubinstein et al. ........... 707/722
2014/0324870 A1* 10/2014 Kami ................... G06K 9/6215 707/737

OTHER PUBLICATIONS

Michael C. Mitchelmore and Paul White—"Development of Angle Concepts by Progressive Abstraction and Generalisation"—Educational Studies in Mathematics, Mar. 2000, vol. 41, Issue 3, pp. 209-238—@2000 Kluwer Academic Publishers. Printed in the Netherlands.*

* cited by examiner

FIG. 4

TRANSMITTING/RECEIVING FREQUENCY

| TRANSMISSION | RECEPTION |
|---|---|
| 200 | 10 |

USAGE TIME

| 2 A.M. TO 5 A.M. | 5 A.M. TO 8 A.M. | 8 A.M. TO 12 P.M. | 12 P.M. TO 3 P.M. | 3 P.M. TO 6 P.M. | 6 P.M. TO 9 P.M. | 9 P.M. TO 11 P.M. | 11 P.M. TO 2 A.M. |
|---|---|---|---|---|---|---|---|
| 1 | 1 | 4 | 10 | 30 | 60 | 42 | 20 |

NUMBER OF CONNECTIONS TO SPECIFIC PERSON

| VICTIM A | SUSPECT B |
|---|---|
| 0 | 1 |

USER PATTERN (AVERAGE PER MESSAGE)

| PHOTOGRAPH | MOVING IMAGE | EMOTICON |
|---|---|---|
| 1 | 0.2 | 10 |

FIG. 5

COMMON FEATURE OF TWO USERS
(BY RELATIONAL STRUCTURE AND ANALYSIS OF MESSAGE)

| NUMBER OF COMMON NEIGHBORS | DEGREE OF CONNECTION OF TWO USERS (NO CONNECTION :0 DIRECT CONNECTION : 1 INDIRECT CONNECTION : 2...n) | COMMON KEYWORD | COMMON PATTERN (PHONE NUMBER,EMAIL, RESIDENTIAL-REGISTRATION NUMBER, ···) | COMMON OBJECT (PHOTOGRAPH, MOVING IMAGE, LINK, TAG, ...) |
| --- | --- | --- | --- | --- |
| 5 | 1 | 30 | 10 | 1 |

SIMILARITY CALCULATING METHOD AND APPARATUS

CROSS-REFERENCE TO RELATED APPLICATIONS

This application claims priority to and the benefit of Korean Patent Application No. 10-2012-0128849 filed in the Korean Intellectual Property Office on Nov. 14, 2012, the entire contents of which are incorporated herein by reference.

TECHNICAL FIELD

The present invention relates to similarity calculation, and more specifically, to a similarity calculating method and apparatus which calculates a similarity between two arbitrary users based on communication activity record information which allows understanding of a social network, and displays the similarity between the two users, if necessary, to improve accuracy in calculating the similarity between the two users.

BACKGROUND ART

Recent digital forensic includes extraction and analyzation of a usage record of a social network service which is widely used. The usage record of the social network service includes a message which is created by a user, uploaded or transmitted multimedia data, positional information, a preference, and connection network information with other people. The forensic analysis for these records is performed by providing a search function of data and suggestion of a relationship between users which are connected through the social network service.

However, due to the usage of a smart phone in which a data communication function and a function as a computer are converged, a frequency of a communication activity using the social network service is sharply increased. Therefore, when the record for the communication activity is extracted to be presented as a list, the size of the list is too much to be able to understand the record at a glance. For this reason, it is difficult to specifically determine a user of communication related to a case, which may contain important information for a digital forensic investigation and comprehend an actual relationship between users who do not have a superficial relationship.

As a known method of comprehending a relationship between speakers in communication, a method that calculates intimacy between an owner of a communication device and a speaker using the communication usage record is suggested. Here, the intimacy is calculated by extracting various communication usage records between the owner and the speaker and calculating the connection strength based on the number of times of communication. When using the above method, it is possible to distinguish a speaker which is intimate with the owner of the device. However, the related art does not provide a method which may comprehend the relationship between two people who do not have a direct communication usage record.

As another related art, a method which represents congruence between personal relationships as a point based on a congruence of interests represented by the users in the social network has been suggested. Here, the congruence is calculated based on a probability that two interests represented by two users coincide with each other. This method represents the similarity between two users who are not directly connected as a point but the determination standard is based on the interest represented by the users. Therefore, the congruence calculated as described above is less accurate as a similarity determining standard which is used for the criminal investigation.

Therefore, a method which improves accuracy in calculating a similarity is demanded.

SUMMARY OF THE INVENTION

The present invention has been made in an effort to provide a similarity calculating method and apparatus which calculates a similarity between two users using a communication activity record which allows understanding of a social network of the users, to improve an accuracy of the similarity.

An exemplary embodiment of the present invention provides a similarity calculating method including: extracting similarity calculating data, which is determined in advance, by receiving a communication activity record for every user, modeling a communication activity pattern for every user and common information between the users based on the extracted similarity calculating data, and calculating a similarity between users using the modeled communication activity pattern for every user and common information.

The method may further include processing the extracted similarity calculating data to numerically represent at least a part of the data and build a relationship network for every user.

The modeling may include modeling the communication activity pattern by calculating a value of a static feature from the similarity calculating data, and modeling the common information by calculating a value of a dynamic feature from the similarity calculating data.

The static feature may include whether to use a photograph, a moving image, or emoticon, a usage pattern based on the communication activity order, a transmitting/receiving time, a transmitting/receiving frequency, and the number of connections with the other user, and the dynamic feature may include the number of commonly connected neighbors, whether to be directly or indirectly connected, whether to use the same keyword, whether to use the same pattern, whether to use the same object, and whether to use the same location.

The calculating of a similarity may include calculating a static similarity by calculating a distance between elements of the static feature for every user, calculating a dynamic similarity by applying a weight using the common information to each element of the dynamic feature for every user, and calculating a similarity between the users using the calculated static similarity and dynamic similarity.

Another exemplary embodiment of the present invention provides a similarity calculating apparatus including: a data extracting unit configured to extract similarity calculating data, which is determined in advance, by receiving a communication activity record for every user, a modeling unit configured to model a communication activity pattern for every user and common information between the users based on the extracted similarity calculating data, and a similarity calculating unit configured to calculate a similarity between users using the modeled communication activity pattern for every user and common information. The apparatus may further include: a data converting unit configured to process the extracted similarity calculating data to numerically represent at least a part of the data and build a relationship network for every user.

The modeling unit may include a static feature modeling unit configured to model the communication activity pattern by calculating a value of a static feature from the similarity calculating data, and a dynamic feature modeling unit configured to model the common information by calculating a value of a dynamic feature from the similarity calculating data.

The similarity calculating unit may include a static similarity calculating unit configured to calculate a static similarity by calculating a distance between elements of the static feature for every user, a dynamic similarity calculating unit configured to calculate a dynamic similarity by applying a weight using the common information to each element of the dynamic feature for every user, and a final similarity calculating unit configured to calculate a similarity between the users using the calculated static similarity and dynamic similarity.

According to the exemplary embodiments of the present invention, the similarity between two users is calculated using a communication activity record which allows understanding of a social network of the users to improve the accuracy in calculating the similarity.

Specifically, the present invention models a static feature which reflects a communication activity pattern of each user from the communication activity record and a dynamic feature which reflects the common information (or feature) between two users and calculates the similarity using the two features to more accurately determine the similarity between the two users.

According to the exemplary embodiments of the present invention, the accuracy in calculating the similarity between two users is improved to easily determine a user having a similarity on the communication activity record with a specific user among many users.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 illustrates an exemplary view of static feature modeling.

FIG. 5 illustrates an exemplary view of dynamic feature modeling.

Figure 1:
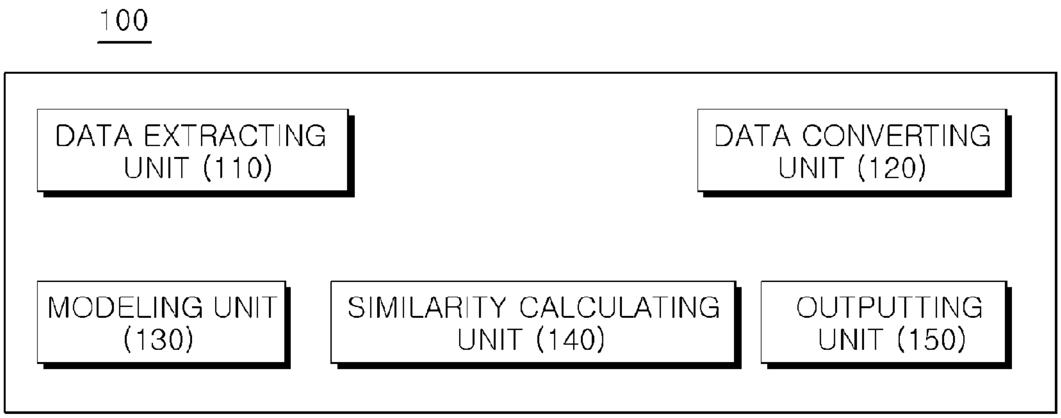
FIG. 1 illustrates a configuration of a similarity calculating apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Other objects and features than the above-described object will be apparent from the description of exemplary embodiments with reference to the accompanying drawings.

Terms used in the following description are used to describe a specific exemplary embodiment but are not intended to limit the present invention. A singular form may include plural form if there is no clearly opposite meaning in the context. In the present invention, it should be understood that term "include" indicates that a feature, a number, a step, an operation, a component, a part or the combination those of described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present invention.

Exemplary embodiments of the present invention will be described in detail with reference to the accompanying drawings. If it is considered that the description of related known configuration or function may cloud the gist of the present invention, the description will be omitted.

Hereinafter, a similarity calculating method and apparatus according to an exemplary embodiment of the present invention will be described in detail with reference to FIGS. 1 to 7.

FIG. 1 illustrates a configuration of a similarity calculating apparatus according to an exemplary embodiment of the present invention.

Referring to FIG. 1, an apparatus according to the exemplary embodiment includes a data extracting unit 110, a data converting unit 120, a modeling unit 130, a similarity calculating unit 140, and an outputting unit 150. The data extracting unit 110 receives large quantity of various types of communication activity records for every user to extract similarity calculating data which is determined in advance.

Here, the communication activity record is a communication activity which uses an application on various devices and may include not only bidirectional communication activity in which at least one of the specific communication parties is present but also a unidirectional communication activity which posts a post in a service for forming a social network.

In this case, the communication activity record may include a transmitting/receiving identifier in accordance with the communication transmission/reception, transmitting/receiving date and time, and various types of conversations. The transmitting/receiving activity may include not only an interactive communication activity between two or more people but also an activity which posts a message in a specific message or provides a feedback to a specific post. An additional personal identifier, a contact list, and other activity contents may be included depending on the communication activity service.

That is, the data extracting unit 110 in the similarity calculating apparatus according to the exemplary embodiment of the present invention extracts a communication activity record (similarity calculating data) of two users who are the targets of the similarity measurement, among large quantity of data provided in various formats. As another form, the data extracting unit may be implemented as a form which extracts a user communication record from a specific device or a service.

The data converting unit 120 quantifies the similarity calculating data extracted by the data extracting unit 110 to be calculated and configures a relationship network and normalizes the similarity calculating data.

Here, the data converting unit 120 may include a quantifying step which quantifies uncalculatable data among the extracted user communication activity record, that is, the similarity calculating data, a relationship network configuring step which may be obtained from the transmitting/receiving list and the contact list, and a normalizing step which normalizes the data.

The modeling unit 130 models the communication activity pattern for every user and common information between the users, based on the similarity calculating data which is converted by the data converting unit 120.

Here, the communication activity pattern means a pattern for a communication activity of the user and may be modeled using data corresponding to a static feature among the communication activity records of the user. The common information may be modeled using data corresponding to a dynamic feature included in the communication activity record between two users.

The static feature in the communication activity record may include whether to use a photograph, a moving image, or emoticon, a usage pattern based on the communication activity order, a transmitting/receiving time, a transmitting/receiving frequency (which may include information indicating whether to perform only reception or only transmission), and the number of connections with the other user.

The dynamic feature in the communication activity record may include the number of commonly connected neighbors, whether to be directly or indirectly connected, whether to use the same keyword, whether to use the same pattern, whether to use the same object, and whether to use the same location.

A set of the static features may be obtained by analyzing the communication activity record of a personal user and a set of the dynamic features may be obtained by collectively analyzing the communication activity records between two users to be compared.

Figure 2:
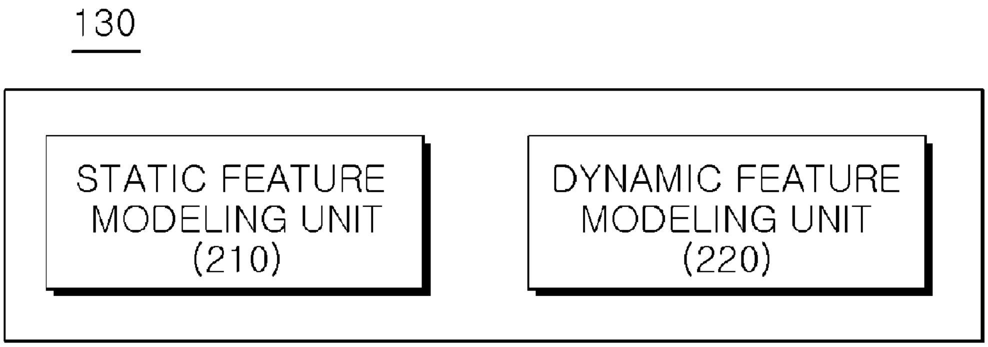
FIG. 2 illustrates a configuration of an exemplary embodiment of a modeling unit illustrated in FIG. 1.

The modeling unit 130, as similar to an example illustrated in FIG. 2, includes a static feature modeling unit 210 and a dynamic feature modeling unit 220. The static feature modeling unit 210 calculates a value of the static feature from the converted similarity calculating data to model the communication activity pattern.

For example, the modeled communication activity pattern may be represented by static feature modeling, similar to an example illustrated in FIG. 4. The static feature modeling may include a usage pattern which indicates a transmitting/receiving frequency, a usage time which indicates a transmitting and/or receiving frequency in a time interval, the number of connections with the other user (for example, a victim A and a suspect B), and the number of photographs, moving images, or emoticons which are averagely included in the message or a usage pattern for an activity sequentially and inevitably accompanied with an arbitrary communication activity.

The dynamic feature modeling unit 220 calculates a value of the dynamic feature from the converted similarity calculating data to model the common information.

For example, the modeled common information is obtained by modeling a common feature between two users and may be represented by dynamic feature modeling, similar to an example illustrated in FIG. 5. The dynamic feature modeling may include the number of neighbors or users which are commonly acquainted to two users, a degree of connection of two users which indicates a numerical value representing that the two users are directly acquainted to each other or indirectly acquainted to each other, a common keyword which is related to two people, a common pattern which indicates common numerical values such as a phone number, an electronic mail address, and a residential registration number, a common object such as a photograph, a moving image, a link, and a tag, and common position information which indicates a common location between the two users such as an address.

The similarity calculating unit 140 calculates a similarity between users using the modeled communication activity pattern for every user and common information. That is, the similarity calculating unit 140 calculates the similarity using a feature set configured by the static feature and the dynamic feature of the two users.

Figure 3:
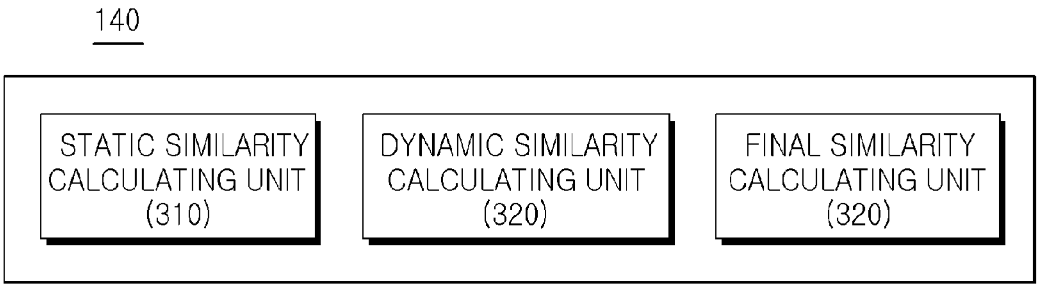
FIG. 3 illustrates a configuration of an exemplary embodiment of a similarity calculating unit illustrated in FIG. 1.

The similarity calculating unit 140, as illustrated in FIG. 3, includes a static similarity calculating unit 310, a dynamic similarity calculating unit 320, and a final similarity calculating unit 330.

The static similarity calculating unit 310 calculates the static similarity of two users for every element of the static feature. For example, the static similarity calculating unit 310 calculates a distance between elements of the static feature for every user to calculate the static similarity.

Here, the static similarity calculates a distance between elements of the static feature of two users and a Euclidean distance calculating method is applied thereto and the static similarity may be calculated by the following Equation 1.

Equation 1

$$sd(x, y) = \sqrt{(p_1 - q_1)^2 + (p_2 - q_2)^2 + \dots + (p_n - q_n)^2} = \sqrt{\sum_{i=1}^{n} (p_i - q_i)^2}$$

Where, $$P = \{p_1, p_2, \dots, p_n\},$$
$$Q = \{q_1, q_2, \dots, q_n\}$$

Here, sd(x,y) indicates a distance between static features (static feature distance) between the two users x and y, P indicates a static feature set of the user x and Q indicates a static feature set of the user y.

The dynamic similarity calculating unit 320 calculates the dynamic similarity between two users using a dynamic feature. For example, the dynamic similarity calculating unit 320 applies a weight using the common information to each element of the dynamic feature for every user to calculate the dynamic similarity.

Here, the dynamic similarity reflects the communication activity pattern of the two users and is calculated by applying a weight to the elements of the dynamic feature set and the dynamic similarity may be calculated by the following Equation 2.

Equation 2

$$dd(x, y) = \sum_{j=1}^{m} a_j \times w_j$$

Where, $$A = \{a_1, a_2, \dots, a_m\},$$
$$W = \{w_1, w_2, \dots, w_m\}.$$

Here, A indicates a dynamic feature set of a user x and a user y, and W indicates a set of weights corresponding to each element of A.

The final similarity calculating unit 330 uses the static similarity and the dynamic similarity, for example, adds the static similarity and the dynamic similarity to calculate a final similarity of two users.

In this case, the final similarity may be calculated by the following Equation 3.

$$\text{similarity}(x,y)=sd(x,y)\times w_5+dd(x,y)\times w_d \quad \text{Equation 3}$$

Here, $w_s$ and $w_d$ indicate weights for the static similarity and the dynamic similarity, respectively. The outputting unit 150 expresses the similarity calculated by the similarity calculating unit 140 as various forms.

For example, the outputting unit 150 may include a step of expressing the similarity as a point or percentage, a step of aligning the plurality of users based on a specific user in accordance with the similarity, and a step of expressing the similarity between the users on the relationship network extracted from the conversation activity record.

As described above, the similarity calculating apparatus according to the present invention uses the static feature to which the communication activity pattern of each user is reflected and the dynamic feature to which a common feature between the two users is reflected together to calculate the similarity so that the similarity between the two users may be more accurately calculated.

Figure 6:
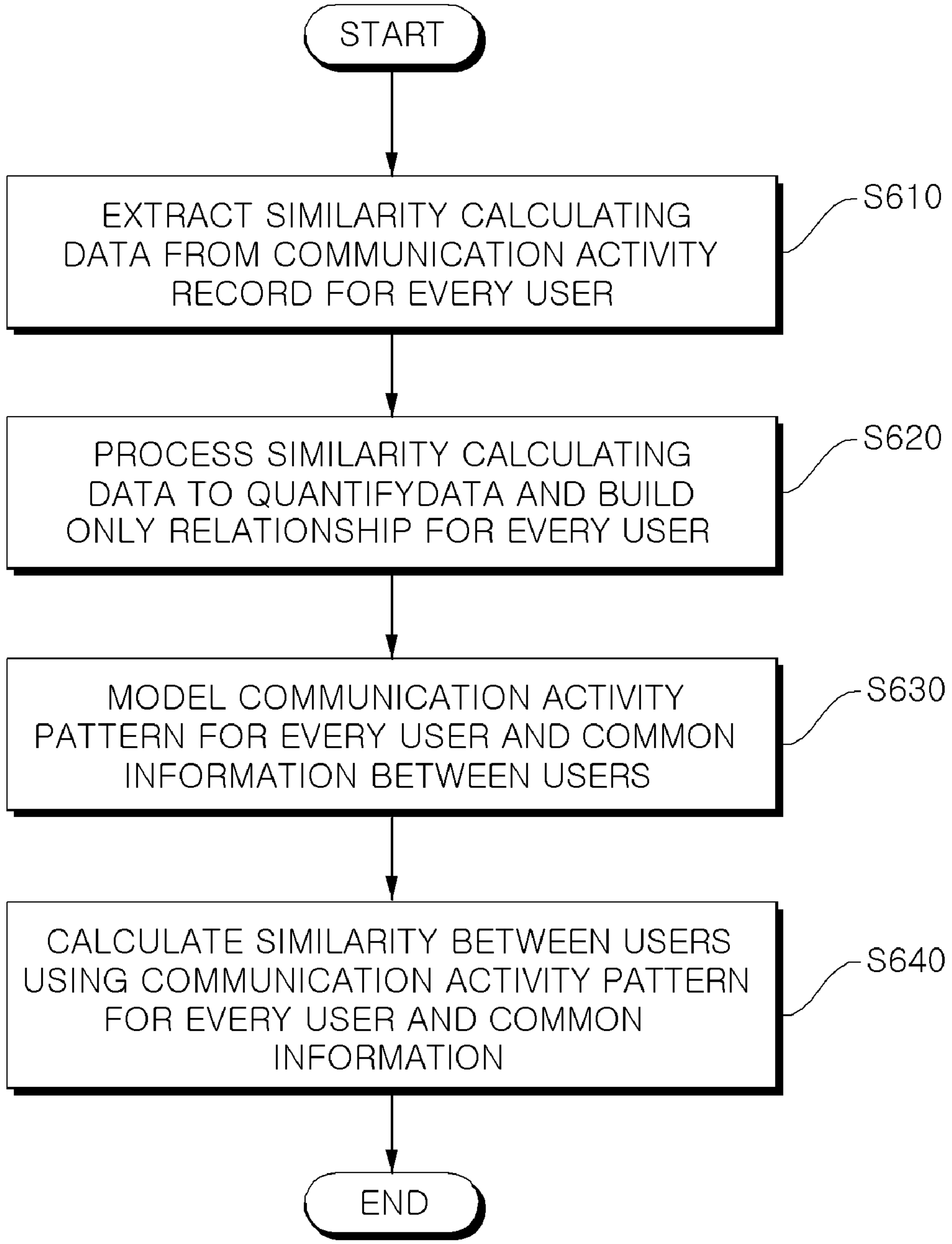
FIG. 6 illustrates a flowchart of an operation of a similarity calculating method according to an exemplary embodiment of the present invention.

FIG. 6 illustrates a flowchart of an operation of a similarity calculating method according to an exemplary embodiment of the present invention and illustrates an operational flowchart of the apparatus illustrated in FIG. 1.

Referring to FIG. 6, in steps S610 and S620, the similarity calculating method according to the present invention extracts similarity calculating data from the communication activity record for every user, processes the similarity calculating data to numerically represent the data, and builds a relationship network for every user.

The similarity calculating data extracted in step S610 may be a communication activity record of two users in order to calculate the similarity. The information included in the communication activity record has been described above, so that the description thereof will be omitted.

In step S620, the converting of similarity calculating data may include a quantifying step which quantifies uncalculatable data among the extracted user communication record, that is, the similarity calculating data, a relationship network configuring step which may be obtained from the transmitting/receiving list and the contact list, and a normalizing step which normalizes the data.

In steps S630 and S640, using the similarity calculating data converted in step S620, the communication activity pattern for every user and the common information between users are modeled and the similarity between the users is calculated using the modeled communication activity pattern and common information.

In this case, the modeling step S630 may model the communication activity pattern using data corresponding to the static feature among the communication activity record of the user and model the common information using data corresponding to the dynamic feature included in the communication activity record between two users.

The static feature in the communication activity record may include whether to use a photograph, a moving image, or emoticon, a usage pattern based on the communication activity order, a transmitting/receiving time, a transmitting/receiving frequency (which may include information indicating whether to perform only reception or only transmission), and the number of connections with the other user.

The dynamic feature in the communication activity record may include the number of commonly connected neighbors, whether to be directly or indirectly connected, whether to use the same keyword, whether to use the same pattern, whether to use the same object, and whether to use the same location.

The static feature modeling and the dynamic feature modeling modeled as described above have been described with reference to FIGS. 4 and 5 and thus the description thereof will be omitted.

Figure 7:
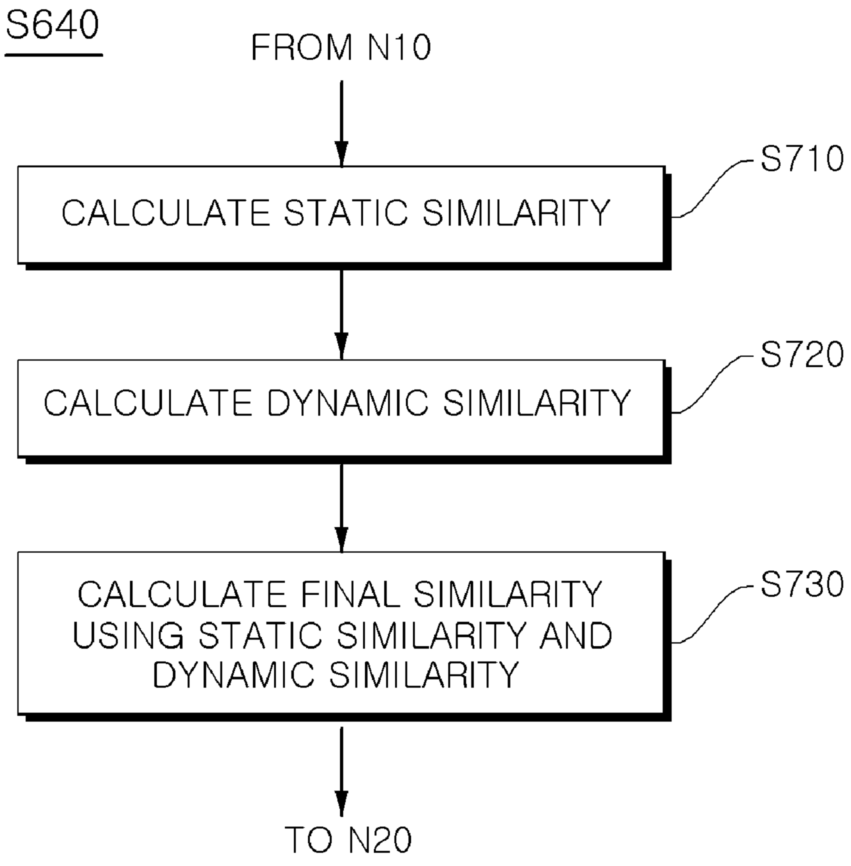
FIG. 7 illustrates a flowchart of an operation of an exemplary embodiment of step S640 illustrated in FIG. 6.

The similarity calculating step S630 includes, as illustrated in FIG. 7, a step S710 of calculating a static similarity of the two users for each element of the static feature, a step S720 of calculating a dynamic similarity of the two users using the dynamic feature, and a step S730 of calculating a final similarity of the two users using the static similarity and the dynamic similarity.

In this case, the static similarity calculating step S710 may calculate the static similarity by calculating the distance between the elements of the static feature for every user and the dynamic similarity calculating step S720 may calculate the dynamic similarity by applying a weight using the common information to each element of the dynamic feature for every user, and the final similarity calculating step S730 may calculate the final similarity by applying weights to the static similarity and the dynamic similarity and adding the similarities.

As described above, the similarity calculating detecting method according to the present invention may configure a feature set formed of a communication connection structure of communication connection structure, the communication activity content, of a reference user and a target user for the similarity determination from the communication activity record and features which may be used to identify the individuals, in order to measure how much a specific user is similar to the other user, and calculate the similarity using the feature set, for the purpose of performing the data structure modeling from the communication activity record and understanding the relationship thereby.

The similarity calculating method according to the present invention may detect the similarity regardless of whether there is a direct communication activity record between two users who are the targets for similarity measurement.

The similarity calculating method according to the exemplary embodiment of the present invention may be implemented as a program command which may be executed by various computers to be recorded in a computer readable medium. The computer readable medium may include solely a program command, a data file, and a data structure or a combination thereof. The program command recorded in the medium may be specifically designed or constructed for the present invention or known to those skilled in the art of a computer software to be used. Examples of the computer readable recording medium include a magnetic media such as a hard disk, a floppy disk, or a magnetic tape, an optical media such as a CD-ROM or a DVD, a magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter. The hardware device may operate as one or more software modules in order to perform the operation of the present invention and a reverse thereof is the same.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A computer implemented similarity calculating method, comprising:

extracting similarity calculating data, which is determined in advance, by receiving a communication activity record for every user;

modeling a communication activity pattern for every user by calculating a value of a static feature from the extracted similarity calculating data;

modeling common information between the users by calculating a value of a dynamic feature from the extracted similarity calculating data;

calculating a static similarity for each user by using elements of the static feature to which the modeled communication activity pattern is reflected;

calculating a dynamic similarity by using the modeled common information for each element of the dynamic feature for every user; and calculating a similarity between the users using the calculated static similarity and the calculated dynamic similarity.

2. The similarity calculating method of claim 1, further comprising:

processing the extracted similarity calculating data to numerically represent at least a part of the data and build a relationship network for every user.

3. The similarity calculating method of claim 1, wherein the static feature includes an average number of photographs, moving images, or emoticons included in a message, a usage pattern based on a communication activity order, a transmitting/receiving time, a transmitting/receiving frequency, and a number of connections with another user.

4. The similarity calculating method of claim 1, wherein the dynamic feature includes a number of commonly connected neighbors, a degree of connection, a common keyword, a common pattern, a common object, and a common location.

5. The similarity calculating method of claim 1, wherein the static similarity is calculated by calculating a distance between elements of the static feature for every user, and the dynamic similarity is calculated by applying a weight using the modeled common information to each element of the dynamic feature for every user.

6. A computer readable recording media in which a program to execute the method of claim 1 is recorded.

7. A similarity calculating apparatus, comprising:

a data extracting unit configured to extract similarity calculating data, which is determined in advance, by receiving a communication activity record for every user;

a static feature modeling unit configured to model a communication activity pattern for every user by calculating a value of a static feature from the extracted similarity calculating data;

a dynamic feature modeling unit configured to model common information between the users by calculating a value of a dynamic feature from the extracted similarity calculating data; and a similarity calculating unit configured to calculate a similarity between the users using the modeled communication activity pattern and the modeled common information, wherein the similarity calculating unit includes:

a static similarity calculating unit configured to calculate a static similarity for every user using elements of the static feature to which the modeled communication activity pattern is reflected, a dynamic similarity calculating unit configured to calculate a dynamic similarity using the modeled common information for each element of the dynamic feature for every user, and a final similarity calculating unit configured to calculate the similarity between the users using the calculated static similarity and the calculated dynamic similarity.

8. The similarity calculating apparatus of claim 7, further comprising:

a data converting unit configured to process the extracted similarity calculating data to numerically represent at least a part of the data and build a relationship network for every user.

9. The similarity calculating apparatus of claim 7, wherein the static feature includes an average number of photographs, moving images, or emoticons included in a message, a usage pattern based on a communication activity order, a transmitting/receiving time, a transmitting/receiving frequency, and a number of connections with another user.

10. The similarity calculating apparatus of claim 7, wherein the dynamic feature includes a number of commonly connected neighbors, a degree of connection, a common keyword, a common pattern, a common object, and a common location.

11. The similarity calculating apparatus of claim 7, wherein the static similarity calculating unit is configured to calculate the static similarity by calculating a distance between elements of the static feature for every user, and the dynamic similarity calculating unit is configured to calculate the dynamic similarity by applying a weight using the modeled common information to each element of the dynamic feature for every user.

12. A computer readable recording media in which a program to execute the method of claim 2 is recorded.

13. A computer readable recording media in which a program to execute the method of claim 3 is recorded.

14. A computer readable recording media in which a program to execute the method of claim 4 is recorded.

15. A computer readable recording media in which a program to execute the method of claim 5 is recorded.

* * * * *